United States Patent [19]
Wales

[11] Patent Number: 6,122,269
[45] Date of Patent: Sep. 19, 2000

[54] PACKET RADIO SYSTEMS

[75] Inventor: Stephen William Wales, Southampton, United Kingdom

[73] Assignee: Roke Manor Research Limited, Hampshire, United Kingdom

[21] Appl. No.: 08/892,892

[22] Filed: Jul. 15, 1997

[30] Foreign Application Priority Data

Jul. 17, 1996 [GB] United Kingdom .................. 9614973
Nov. 18, 1996 [GB] United Kingdom .................. 9623900

[51] Int. Cl.$^7$ ........................................ H04Q 7/24
[52] U.S. Cl. ........................ 370/338; 370/320; 370/350
[58] Field of Search .................................. 370/206, 319, 370/320, 342, 338, 350, 509, 503; 375/200, 341, 346; 455/12.1, 12.2, 12.3

[56] References Cited

U.S. PATENT DOCUMENTS

| | | | |
|---|---|---|---|
| 5,014,272 | 5/1991 | Yoshida | .................................. 370/106 |
| 5,103,459 | 4/1992 | Gilhousen et al. | ......................... 375/1 |
| 5,307,341 | 4/1994 | Yates et al. | .............................. 370/320 |
| 5,640,432 | 6/1997 | Wales | ....................................... 375/346 |
| 5,956,646 | 9/1999 | Kolev et al. | ............................. 455/502 |

*Primary Examiner*—Huy D. Vu
*Assistant Examiner*—Alexander Boakye
*Attorney, Agent, or Firm*—Evenson, McKeown, Edwards & Lenahan, P.L.L.C.

[57] ABSTRACT

A packet radio system is provided with a multiple access scheme which operates to schedule transmissions of data bearing radio packets on a common communications channel from a plurality of users to a common receiver of the said system. The radio packets via which the plurality of users communicate include synchronization data, and by providing the common receiver with a multi-user detector, contemporaneously transmitted packets may be detected and recovered in dependence upon the synchronization data, thereby substantially increasing a throughput of the packet radio system.

7 Claims, 5 Drawing Sheets

PACKET RADIO SYSTEMS

The present invention relates to packet radio systems, wherein users are provided with a means for communicating by transmitting bursts of information bearing radio signals on common communications channels.

Packet radio systems operate to provide a facility for a plurality of users to transmit bursts of information bearing radio signals on a common communications channel. The bursts of radio signals, which are known as packets, are detected at a receiver embodied within a central or hub station. In order to schedule transmissions of packets from a plurality of users, packet radio systems are provided with a multiple access scheme which operates to arrange for the packets to be transmitted by the users so that with high probability packets are not transmitted contemporaneously. Packets which are transmitted contemporaneously are likely to interfere at the receiver of the hub station, preventing communication from any user. A contemporaneous transmission of packets therefore results in the packets being lost, and is hereinafter referred to as a collision.

There are a plethora of multiple access schemes known to those skilled in the art. For example, a multiple access scheme known as ALOHA provides a means whereby users within a packet radio system are permitted to transmit at any time. Users are provided with a means for detecting collisions, in which case each user waits for a random time period before re-transmitting its packet.

Often physical constraints prevent users from detecting collisions, and so are provided with a feedback channel, from the hub station to indicate whether a collision has occurred. To this end, the hub station is arranged to transmit acknowledgement data to the user on the feed-back channel, indicative of whether a packet was received successfully or not, and a representation of the user which transmitted the packet. In this context a successful transmission means that a packet was received at the receiver of the hub station and from which data represented by the packet was recovered.

When packets from different users collide it is usually the case that all data carried by packets involved in the collision is lost and has to be re-transmitted, resulting in an increased delay and a reduction in an information throughput of the system.

In our co-pending GB patent application Ser. No. 2286506A a method and apparatus for multi-user detection is disclosed, which provides an improvement in a performance of receivers in the presence of like modulated co-channel interference. A multi-user detector and detection process is disclosed for burst mode transmission of data and for use in recovering a wanted signal in a presence of high levels of like-modulated co-channel interference. The process operates to contemporaneously detect both wanted and interfering unwanted signals that are present in a received signal which serves to improve the receiver's ability to recover the wanted signal.

It is an object of the present invention to provide advantages to multiple access schemes wherein data bearing packets of radio signals collide from time to time.

According to the present invention there is provided a packet radio system, comprising a multiple access scheme which operates to schedule transmissions of data bearing radio packets on a common communications channel from a plurality of users to a common receiver of the said system, characterised in that the radio packets include synchronisation data, and in that the common receiver includes a multi-user detector which operates to detect and recover contemporaneously transmitted packets in dependence upon the synchronisation data, thereby substantially increasing a throughput of the packet radio system.

To provide a means for detecting a plurality of contemporaneously transmitted packets involved in a collision, the multi-user detector is used to separate the transmitted packets, where instead of treating received signals as comprising wanted and unwanted signals, the received signals are treated as comprising a plurality of wanted packets, which are separated by the multi-user detector thus resolving the collision. To this end, synchronisation sequences associated with each packet involved in a collision must be different to allow the characteristics of the transmission path that each packet has traversed to be measured. To simplify the multi-user detector and improve its effectiveness in recovering all packets lost in a collision, the technique should be used in conjunction with slotted random access protocols, where packets may arrive at the receiver contemporaneously.

The radio packets may be modulated in accordance with a trellis coded modulation scheme, wherein a different code is used to modulate each contemporaneously transmitted packet.

The detector disclosed in our co-pending patent application Ser. No. 2286506A, is applicable to modulation schemes with memory. Trellis coded modulation is also a modulation scheme possessing memory where a set of states describe the received signal in the absence of noise or other disturbances. Extension of the multi-user detector to receive multiple trellis code modulated signals is straightforward with appropriate modifications to the super-state trellis. The channel estimation procedure of the multi-user detector requires that each user employs a different synchronisation sequence. This provides a means whereby the channel estimator can provide an estimate of each channel impulse response between each user and the multi-user detector. This serves to provide a means for separating contemporaneously transmitted packets at the detector, in combination with the super-state trellis. Consequently in a random access system utilising a k-user detector at the receiving hub station, with trellis coded modulation, a different code would be associated with each of the k synchronisation sequences in use. This provides a means for further facilitating separation of contemporaneously transmitted packets.

According to an aspect of the present invention there is provided a method of multiplexing packets of data bearing radio signals on a common communications channel comprising the steps of;

providing the said packets with synchronisation data, arranging for packets to be transmitted on the common communications channel in accordance with a multiple access scheme, and resolving collisions of packets resulting from contemporaneous transmissions with a multi-user detection process in combination with the synchronisation data.

One embodiment of the present invention will now be described by way of example only with reference to the accompanying drawings, wherein.

Figure 1:
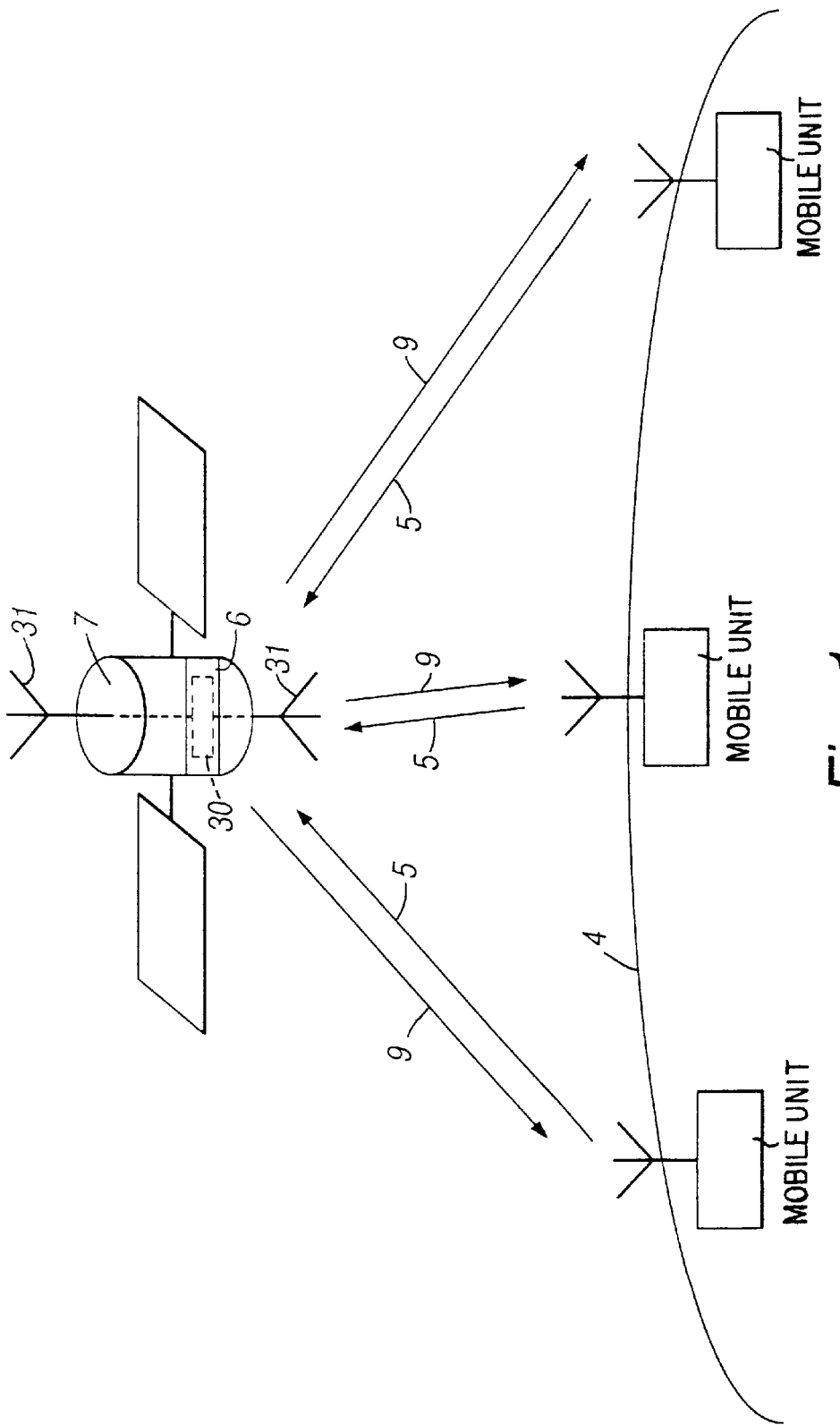
FIG. 1 is a conceptual block diagram of a packet radio system providing communications for a plurality of user units distributed over the earth's surface.

An illustration of an arrangement for providing communication to users distributed over the earth's surface with a packet radio system can be seen in FIG. 1. In FIG. 1 mobile units 1, 2, 3, are shown to be situated at different places on the earth's surface 4. The mobile units 1, 2, 3, are arranged to communicate by transmitting packets of radio signals on a common communications channel represented as a conceptual line 5, with a hub station 6, arranged to be embodied within the satellite 7. The arrangement of the satellite 7, orbiting the earth above the mobile units 1, 2, 3, provides a facility whereby high frequency or microwave signals may be detected by the hub station 6, through an antenna 31, embodied within the satellite 7, and forwarded to other mobile units or retained in the satellite for further transmission. Acknowledgements indicative of successfully received packets, are transmitted by the hub station 6, to the mobile units 1, 2, 3, via a feed-back communication channel represented by the conceptual line 9. Although in the example diagram shown in FIG. 1, the packet radio system is arranged to operate with mobile units 1, 2, 3 disposed on the earth's surface, the mobile units 1,2, 3, may be either fixed earth stations or mobile, and the radio system may operate on any part of the earth and the hub station may be embodied in a building.

Figure 2:
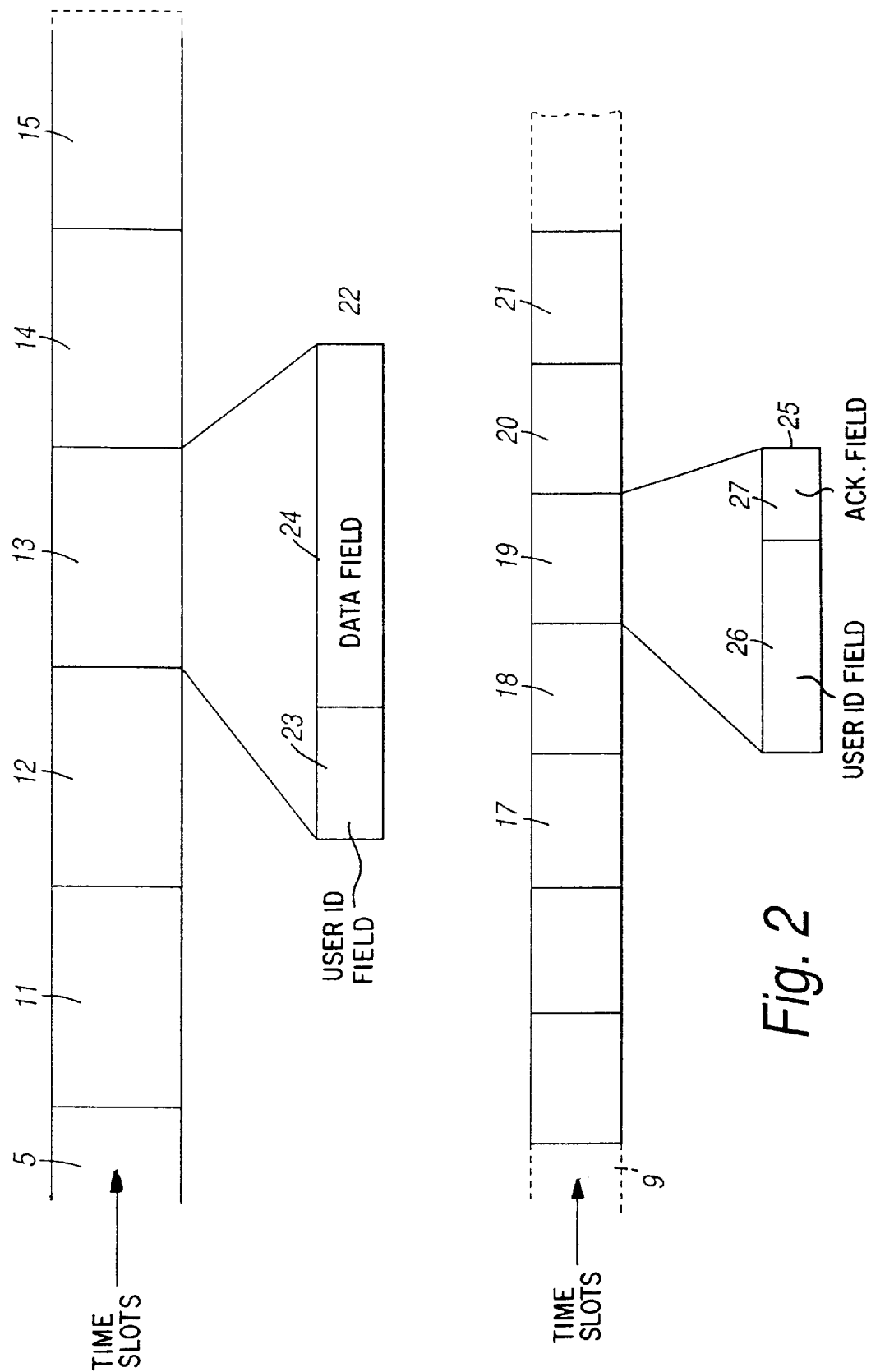
FIG. 2 is a conceptual diagram of a time divided broadcast channel and an acknowledgement channel.

An embodiment of the present invention will be described with reference to the ALOHA multiple access protocol, although it will be appreciated that the invention can be embodied within a packet radio system using any multiple access scheme. The hub station 1, in FIG. 1, is provided with a protocol processor (not shown) which operates to generate signals transmitted to mobile units 1,2,3, on the feed-back channel 9, following successful reception of the packets on the common communications channel 5. An example of the transmission of radio packets on the common communication channel 5, in accordance with the packet radio system may be seen in FIG. 2, wherein parts also appearing in FIG. 1 bear the same numerical designations. In FIG. 2 the common communication channel 5, is divided into a number of predetermined time slots 11, 12, 13, 14, 15. In accordance with the operation of the ALOHA protocol, any of the user units 1, 2, 3 may transmit a radio packet 22 in any of the predetermined time slots 11, 12, 13, 14, 15. As such contemporaneous transmission in time slots 11, 12, 13,14,15 will result in a collision between packets. Hence a packet 28 is shown in FIG. 2 to collide with packet 22.

Acknowledgements to the transmission of radio packets within the time slots 11, 12, 13, 14, 15, are provided on the acknowledgement channel 9. In this example embodiment the acknowledgement channel 9, comprises a number of predetermined time slots wherein acknowledgements may be transmitted. The predetermined time slots 17, 18, 19, 20, 21 are provided for the transmission of acknowledgement data by the hub station to the mobile units. Acknowledgement time slots for corresponding transmission of packets in the time slots 11, 12, 13, 14, 15 are respectively the time slots 17, 18, 19, 20, 21. In this example embodiment, a mobile user 1, transmits a data packet 22 in time slot 13 which collides with the data packet 28, also transmitted in time slot 13. The data packet 22 comprises data appertaining to a user ID contained in a field 23, and data to be communicated contained in a field 24. If no data is successfully received by the hub station 6, an acknowledgement is transmitted in the corresponding time slot 19 which serves to indicate an unsuccessful transmission. The acknowledgement data is shown in FIG. 2 as the data packet 25. The data packet 25 comprises data representative of the user ID 26, and an acknowledgement field 27, to indicate successful or unsuccessful reception of the data packet 22. In accordance with the ALOHA protocol, once the mobile units 1, 2, 3, detect that a collision has occurred, they are arranged to re-transmit packets in the time slots 11, 12, 13, 14, 15 which are selected in accordance with a random selection process.

To resolve collisions occurring at the receiver of the hub station a multi-user detector is embodied within a receiver at the hub station 6. Furthermore the ALOHA protocol is modified to the effect that in the event of a collision of the first transmission attempt, packets which are to be re-transmitted are provided with a different synchronisation sequence, and furthermore maybe transmitted using different trellis codes. This provides a means whereby a re-transmitted packet and a new packet which collide, may be separated and the data recovered. This will remove one of the limiting factors on the achievable throughput of the ALOHA protocol namely the collision of new packets with re-transmitted packets. Alternatively, all contemporaneously transmitted packets may be arranged to be provided with different synchronisation sequences. To provide a means whereby the multi-user detector may operate to separate packets which have collided, the multiple access protocol would arrange for a different synchronisation sequence to be embodied within each colliding packet. This might be achieved by arranging for each user unit to use a different synchronisation sequence to the synchronisation sequences used by other user units. Additionally, separation of contemporaneously transmitted packets maybe facilitated by modulating each with a different trellis code.

Figure 3:
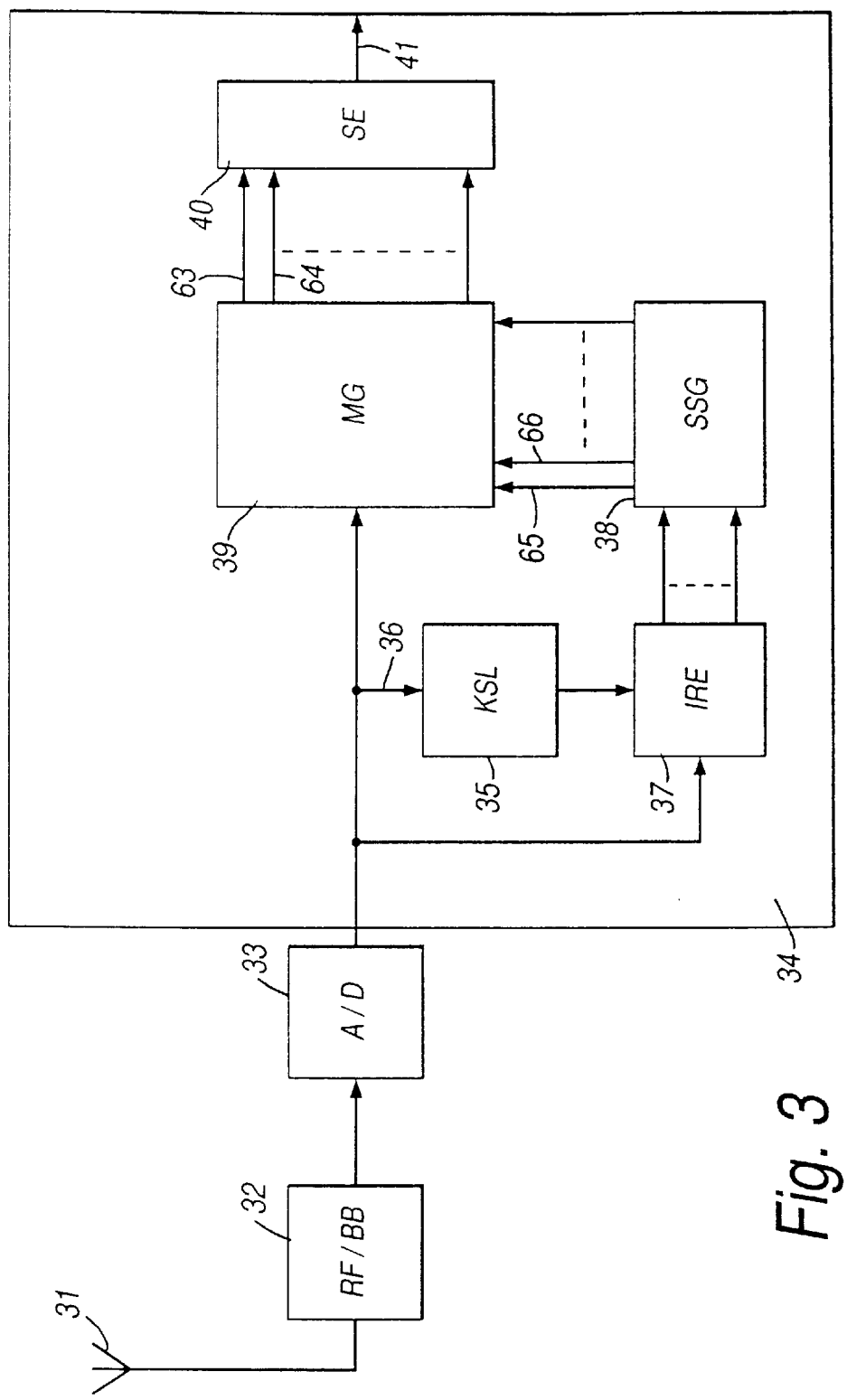
FIG. 3 is a simplified block schematic diagram of a radio receiver, including a multi-user detector.

A receiver embodying a multi-user detector for use with the ALOHA multiple access scheme is shown in block diagram form in FIG. 3, where parts also appearing in FIG. 1 bear the same numerical designations. The receiver comprises a single aerial 31, which is arranged to feed an RF to baseband signal converter 32. Output signals at baseband from the RF to baseband signal converter 32 are fed to an analogue to digital converter 33 which provides digital signal samples of the received baseband signal. These samples are fed to an multi-user detector 34, comprising operational blocks which will now be described and which are shown within a shaded region of the drawing. The multi-user detector 34, comprises a known sequence locator 35, including a store which is primed with all known synchronisation sequences and a correlator which serves to correlate a received signal, present on a line 36 which is fed from the A to D converter 33, with the known data sequences contained within the store.

Position estimate signals from the known sequence locator 35, appertaining to the received signal are fed to an impulse response estimator 37 which serves to calculate in respect of each data sequence signal identified, a corresponding impulse response, the character of which is determined by the channel path in the ether through which the signal has travelled. As will readily be appreciated, the colliding packets will each be characterised by a different impulse response since they travel through different channel paths. Signals from the impulse response estimator 37 are fed to a signal set generator 38 which serves to produce a set of possible signals in respect of each signal. The signal sets thus produced are fed to a detector arrangement comprising a metrics generator 39 and a sequence estimator 40 (which is in effect a trellis processor), thereby to provide an output signal on a line 41, which comprises estimated data representative of collided packets. The metrics generator 39, and the sequence estimator 38, and trellis processor 40, in combination serve in effect to compare the signals of each set with the received signal appertaining to the collided packets, whereby each packet is detected.

The manner in which the individual blocks of the multi-user detector 34, operates will now be described in greater detail with reference to FIGS. 4, 5 and 6, for a particular case of a collision between two packets, although it would be appreciated that the explanation can be extended to K packets.

Figure 4:
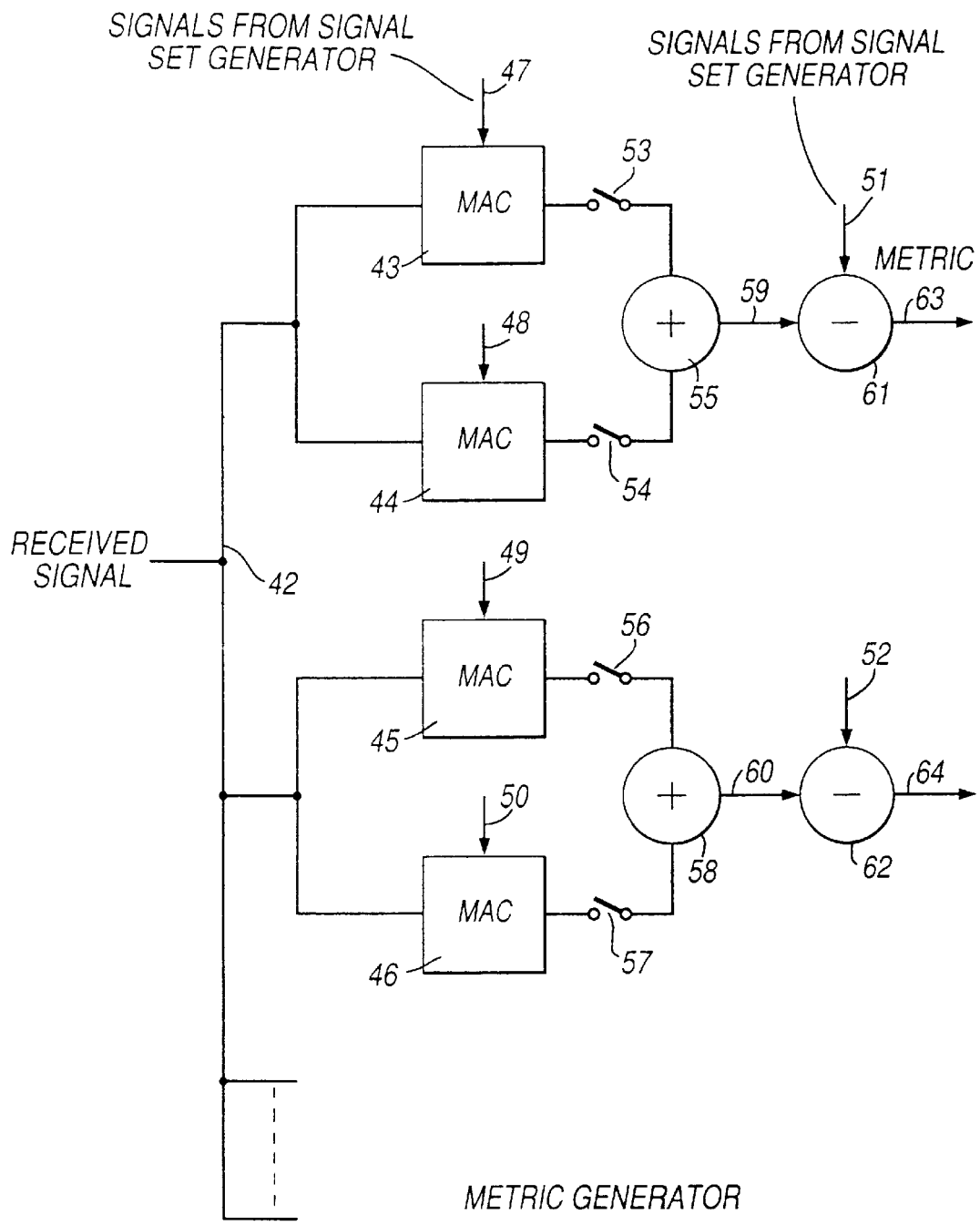
FIG. 4 is a block schematic diagram of the metrics generator 39 shown in FIG. 3.

Referring now to FIG. 4, which shows in more detail the metrics generator 39, received signals from the A to D converter 33 are fed on a line 42 to a number of MAC units 43, 44, 45 and 46 which serve to multiply and accumulate over each data symbol period of the received signal samples on the line 42 with signals from the signal set generator 38 that are applied to lines 47 to 52. Although only four MAC units 43, 44, 45 and 46 are shown in FIG. 4, it will be understood that one MAC unit will be provided for each possible signal in the signal set in FIG. 6. Signals from the MAC units 43 and 44 are fed via switches 53 and 54 to an adder 55 and signals from the MAC units 45 and 46 are fed via switches 56 and 57 to an adder 58 thereby to provide output signals on lines 59 and 60 respectively for subtraction units 61 and 62 which are fed also via lines 51 and 52 respectively with signals from the signal set generator 38, thereby to provide output signals on lines 63 and 64 which are fed to the sequence estimator 40.

Figure 5:
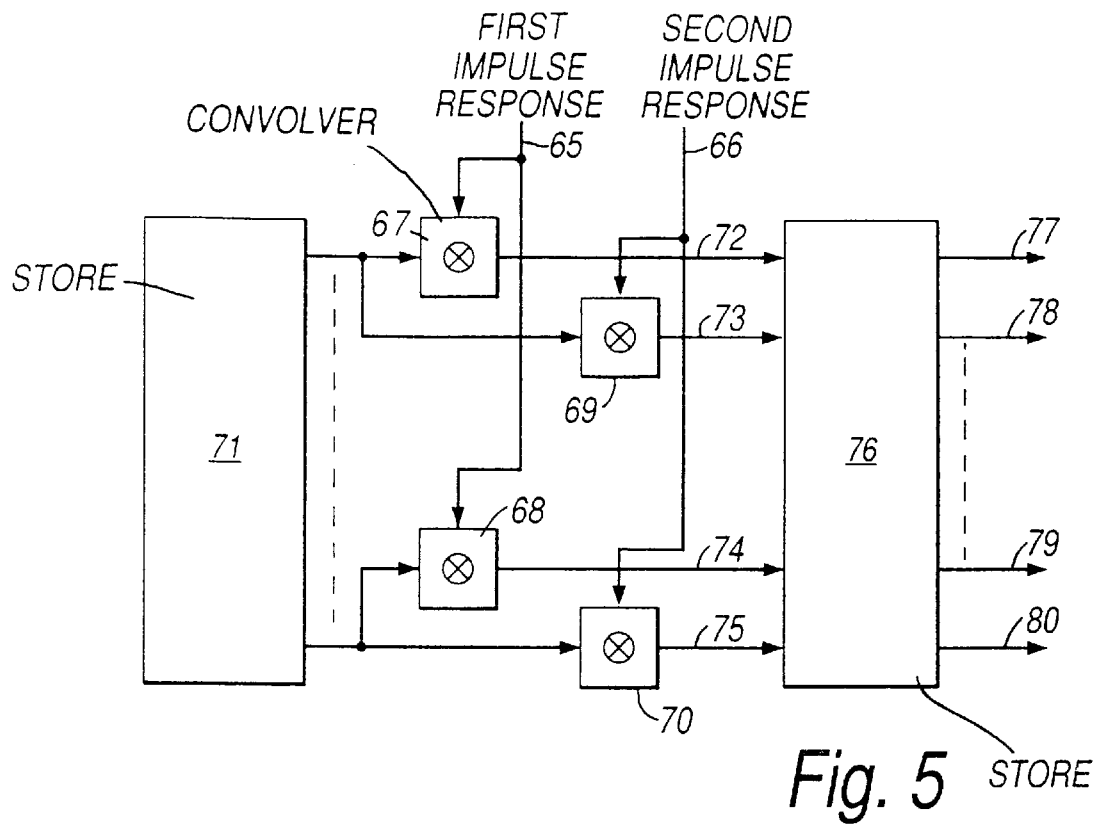
FIG. 5 is a block schematic diagram of the signal set generator 38 shown in FIG. 3.

Referring now to FIG. 5, the signal set generator 38 is fed on lines 65 and 66 from the impulse response estimator 37 with signals corresponding to the impulse response of a first and a second of the two colliding packets respectively. In FIG. 5, parts also appearing in FIG. 4, bear identical numerical designation. The lines 65 and 66 are arranged to feed multipliers 67, 68, 69 and 70, which multipliers are fed also from a store 71 containing all possible signal patterns over a predetermined number of symbol intervals. Output signals from the multipliers 67, 68, 69 and 70 are fed on lines 72, 73, 74 and 75 to a temporary store 76 which contains a result of convolving each of the first and second impulse responses with all possible data sequences within the predetermined number of symbol intervals. Output signals are produced on lines 77, 78, 79 and 80, only four of which are shown in the drawing, thereby to provide input signals for the metric generator 39. The sequence estimator 40, which in effect comprises a trellis processor, operates on the signals provided from the metrics generator 39 as shown in FIG. 3.

More detailed operation of the multi-user detector hereinbefore described will now be considered. Considering firstly the sequence estimator 40, an efficient optimum technique for performing maximum likelihood sequence estimation is the Viterbi algorithm. The Viterbi algorithm is generally well known to those skilled in the art, but attention is hereby directed to IEEE Proc., Volume 61, 1973, pages 268 to 278 for further information. In applying the Viterbi algorithm to conventional equalisation/demodulation problems the output of the channel prior to noise addition is viewed as a finite state Markov process. For linear modulation methods the states of this process relate to data sequences of length v, which span the memory of the channel and modulation process. The output of the channel can then be described by a sequence of these states, and the task of the Viterbi algorithm is to find the sequence of states with the highest probability of occurrence. This sequence becomes the estimated data sequence, i.e. the output 41. Each state in the conventional equalisation/demodulation process for the single signal is described by a state descriptor $\xi_i$ for the i-th state. As each colliding signal can be similarly described, then for the K colliding signals, the super-state $\Xi_i$ can be defined as being formed from the K+1 state descriptors of the K+1 signals: $E=(\xi_{i_O}, \ldots \xi_{j_K})$. If there are S states describing each signal, then there are $S^{K+1}$ super-states, and because each set of states describes a finite state Markov process, then this property applies to the super-states also. Describing each state by the v-tuple of data symbols: $(a_{n-1}, \ldots a_{n-v})$, $a_i \in [0, M-1]$, then there are M transitions emanating from each state, corresponding to the M possible values that the n-th data symbol can take. So from each super-state there are $M^{K+1}$ transitions. If however, the symbol sequence has been modulated in accordance with a modulation scheme with memory, such as Trellis Coded Modulation, then the number of transitions will be dependent on the number of bits in each symbol used to generate parity bits of the modulation scheme. The progression of a data sequence in terms of its state description can be represented on a trellis diagram, which shows all possible transitions between super-states at time (n−1)T and time nT. The trellis diagram of the super-state trellis for M=2; v=1; K=1 is depicted in FIG. 6.

This is the simplest non-trivial super-state trellis for this particular problem; applying to a binary modulation, two colliding packets and where the channel and modulation process have a memory of one symbol. For each transition in the trellis the following incremental metric is calculated which is effected by the metric generator 39.

$$\gamma_{i,j} = \sum_{l=0}^{\lambda-1} \left| r(l+n^\lambda) - \sum_{k=0}^{K} c_k(l, a_k^{i,j}) \right|^2 \quad (1)$$

Where $\gamma_{i,j}$ is the incremental metric for the transition between super-state i and super-state j. The data symbol sequences of length v+1 symbols causing this transition are denoted by $$a_k^{i,j}.$$

In equation (1), r(|) is the |-th sample of the received signal at time $|T/\lambda$, where $\lambda$ is the number of samples per data symbol period (T). The signals $$c_k(l, a_k^{i,j})$$

are generated by the signal set generator 38, from the impulse response of the k-th channel, according to equation (2) below:

$$c_k(l, a_k^{i,j}) = \sum_{j=0}^{D\lambda} h_k(j) S(l-j, a_k^{i,j}) \quad (2)$$

Where D is the duration of the channel impulse response in symbol periods, $h_k(j)$ the j-th coefficient of the channel impulse response for the k-th colliding packet, obtained from the channel impulse response estimator 37. The accumulated metric for the i-th super-state is denoted by $\Gamma_i$, and so for the n-th data symbol the following selection procedure is performed at each super-state.

$$\Gamma_j = \min_{i \in \alpha}[\Gamma_i + \gamma_{i,j}] \quad (3)$$

Where α is the set of super-states merging in the j-th super-state. At the j-th new state, the old state that gives rise to the smallest accumulated metric is added to a buffer, which stores the sequence of states leading to the j-th state. If the observation length of the receiver is N symbols, then the detected data symbol is recovered from the state stored N symbols previously, and associated with the current state with the smallest accumulated metric. Data sequences appertaining to both first and second collided packets can be detected using this technique.

Figure 6:
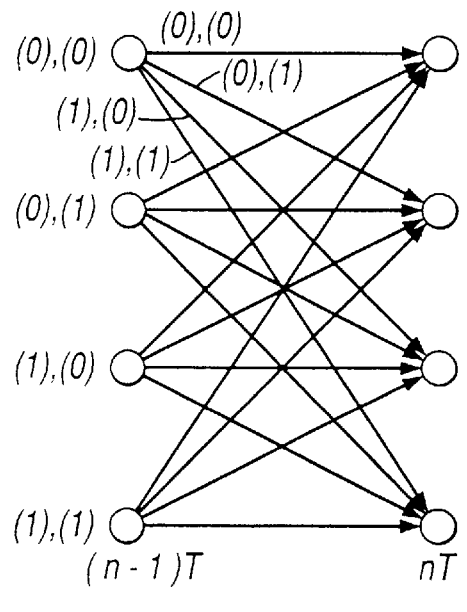
FIG. 6 is a diagram illustrating operation of a super-state trellis.

A metric generation element for the trellis of FIG. 6 is implemented in FIG. 4, where the boxes marked MAC indicate a multiply-accumulate operation, the output of which is sampled every data symbol period. The expression for the incremental metric has been taken, and simplified to group all terms not involving the received signal into one term $$\alpha(a_0^{i,j}, a_1^{i,j}),$$

given in equation (4) below. This is then calculated each time the impulse response estimate is updated. A term involving the modulus of the received signal is removed (being independent of the data sequence $a_k^{i,j}$) and the minimisation replaced by a maximisation.

$$\alpha(a_0^{i,j}, a_1^{i,j}) = \sum_{l=0}^{\lambda-1} 2\text{Re}[c_0(l, a_0^{i,j})c_1^*(l, a_1^{i,j})] - |c_0(l, a_0^{i,j})|^2 - |c_1(l, a_1^{i,j})|^2 \quad (4)$$

The result is to make the metric generation process considerably more computationally efficient, providing the impulse response estimate does not require updating too regularly. For a case where only two packets have collided only, twice the number of multiplications are required over the conventional detector. However, the number of additions is increased in proportion to the increase in the number of states.

The super-state trellis approach, described above, provides an optimal solution to the detection of K+1 signals in the presence of K+1 colliding packets and Gaussian noise. The complexity of the super-state trellis means that its application is restricted to situations where the memory of the channel and modulation process is only a few symbols and when only two packets have collided. A simplification to the sequence estimator is disclosed in our co-pending patent application Ser. No. GB 2286506A to which the attention of the reader is hereby drawn. The simplification operates to have an effect such that only a subset of super-states are considered at each symbol interval.

Turning now to the channel impulse response estimator 37 as shown in FIG. 3, its operation is described in detail in our copending application Ser. No. GB2286506A but for completeness will be outlined here as follows.

The channel estimation techniques hereinbefore described rely on some portion of the transmitted packet being known at the receiver. Typically this takes the form of some known data symbols inserted into the information content at the start of each packet hereinbefore referred to as synchronisation sequences. The colliding packets are assumed to use different sets of data symbols in this known part. Initially the problem of estimating the impulse response of both first and second packets is considered for a situation wherein the synchronisation sequences of the first and second packets are time-aligned.

For the case of a signal received in the presence of some additive noise, the most common method of estimating the channel impulse response is to find the set of coefficients (ĥ) which minimise the following quantity:

$$|\varepsilon|^2 = \min_{\hat{h}} \|r - \hat{h}S\|_2 \quad (5)$$

A vector notation has been adopted in this section wherein, ĥ is a (Dλ+1) element row vector, S a (Dλ+1)×N circulant matrix, where N is the length of a known signal, r is an N-element row vector containing samples of the received signal at the position of the known synchronisation sequences and $\|\cdot\|_2$ denotes the vector 2-norm. The coefficients obtained in the minimisation are those of a Wiener filter, and are the minimum mean square error estimate whenever the autocorrelation function of the transmitted signal is a delta function.

The extension of this procedure to deal with multiple signals is quite straightforward. The quantity involved in the minimisation to obtain the impulse response coefficients becomes:

$$|\varepsilon|^2 = \min_{\hat{h}_k} \left\| r - \sum_{k=0}^{K} \hat{h}_k S_k \right\|_2. \quad (6)$$

Differentiation with respect to the impulse response coefficients, and setting the result to zero yields a set of simultaneous equations, from which recursive and block estimation procedures can be derived.

$$\frac{\partial}{\partial \hat{h}_l}(\varepsilon\varepsilon^*) = -2S_l^H\left(r - \sum_{k=0}^{K} \hat{h}_k S_k\right) \quad (7)$$

Defining $$\Phi_{i,j} = S_i S_j^H$$

as being the cross-correlation matrix between signals i and j, and $\Psi_i = S_i r^H$, then the solution for the impulse response coefficients can be obtained by solving the following system of equations:

$$\begin{bmatrix} \Phi_{0,0} & \cdots & \Phi_{0,K} \\ \cdots & \Phi_{i,j} & \cdots \\ \Phi_{K,0} & \cdots & \Phi_{K,K} \end{bmatrix} \begin{bmatrix} \hat{h}_0 \\ \cdots \\ \hat{h}_K \end{bmatrix} = \begin{bmatrix} \psi_0 \\ \cdots \\ \psi_K \end{bmatrix} \quad (8)$$

The above system of simultaneous equations can be solved by a variety of means known to those skilled in the art. The block matrix formed from the correlation matrices $\Phi_{i,j}$ is Hermitian positive definite, and so Cholesky decomposition is an efficient and numerically stable way of obtaining a solution. In this connection attention is directed to a book by G H Golub and C F Van Loan, entitled "Matrix Computations", Johns Hopkins University Press, 1989.

The location of the synchronisation sequences for the colliding packets will be offset from each other, and this offset may be such that the packets are non-overlapping. To find the location of each data sequence is a straightforward procedure. The received signal is fed into a buffer, and multiple correlators, each matched to one of the possible known data sequences are used to find the location of the known data sequences based upon finding the position with the maximum correlator output. Having determined the location of the synchronisation sequences for each of the K+1 signals, the process of estimating the impulse response of each packet is performed, having regard to known synchronisation sequence vectors.

Performing a cross-correlation operation with the known synchronisation sequences for each of the collided packets at the positions in the received signal obtained from the search operation above yields an estimate of the impulse response for each of the collided packets. Denoting the j-th coefficient of the impulse response estimate for the k-th signal as $\hat{h}_k(j)$, then this initial estimate can be obtained from:

$$\hat{h}_k(j) = \sum_{i=0}^{N\lambda-1} r^*(i+q_k)S_k(i-j) \quad j \in [0, D\lambda] \quad (9)$$

In the above equation r(i) are the samples of the received signal, $S_k(i)$ being the modulated samples of the known synchronisation sequence for the k-th signal, and $q_k$ the location of the start of this sequence within the received signal. The known data sequence is of duration N symbols. At this stage, each impulse response will include components of all other impulse responses, due to cross-correlation effects between the modulated data sequences of the known synchronisation signals, and those comprising the received signal. For very large values of N, greater than one hundred, these terms will be sufficiently small to yield an adequate estimate of the impulse response of both colliding packets.

A modification that could be applied to any slotted protocol is to employ a k-user detector at the receiving hub station, and whenever a packet is transmitted one of k synchronisation sequences is randomly selected. Collisions between users selecting the same synchronisation sequence are resolved in accordance with whatever protocol is employed.

The multi-user detector as hereinbefore described may be extended for use in detecting collided packets, wherein the packets have been modulated with a modulation scheme with memory such as trellis coded modulation. As such transitions between states of the super state trellis will be determined by the trellis code of the trellis code modulator. For a trellis code with memory 1, and a BPSK (binary) modulation scheme, the super state trellis diagram given in FIG. 6, provides a simple example of transitions between states. However, for any other trellis coded modulation scheme adaptation of the super state trellis of FIG. 6, would be required, so as to reflect the memory of the code. With knowledge of the trellis code used for modulation of the collided packets, the multi-user detector may operate to more easily separate the collided packets. In particular by using different synchronisation sequences, the impulse response estimator and known sequence locator 35, may be provided with a means for more easily identifying and detecting a plurality of collided packets.

As will be appreciated by those skilled in the art, various modifications may be made to the embodiments hereinbefore described without departing from the scope of the present invention. In particular the multi-user detector may be used for any multiple access scheme wherever there is a possibility of data from different sources colliding.

What is claimed is:

1. A packet radio system, comprising a multiple access scheme which operates to schedule transmissions of data bearing radio packets on a common communications channel from a plurality of a users to a common receiver of said system, wherein:

said radio packets include synchronization data and are arranged to be modulated in accordance with a trellis coded modulation scheme;

said common receiver includes a multi-user detector which operates to detect and recover contemporaneously transmitted packets in dependence upon said synchronization data, thereby substantially increasing a throughput of said packet radio system; and radio packets which are contemporaneously transmitted on said common communications channel are arranged to be re-transmitted with substantially different synchronization data and are arranged to be modulated with substantially different trellis codes.

2. A packet radio system as claimed in claim 1, wherein each of the plurality of users arranges to transmit radio packets with substantially different synchronization data.

3. A packet radio system as claimed in claim 1, wherein each of the plurality of users arranges to trellis code modulate radio packets with a substantially different trellis code.

4. A method of multiplexing packets of data bearing radio packets on a common communications channel as claimed in claim 3, further comprising:

arranging for each of a plurality of contemporaneously transmitted trellis code modulated radio packets to be modulated with a different trellis code.

5. A method of multiplexing packets of data bearing radio signals on a common communications channel as claimed in claim 4, wherein the radio packets are generated by a plurality of users pursuant to communicating via transmission of the said radio packets, further comprising:

arranging for each user to modulate trellis code modulated radio packets transmitted thereby with a substantially different trellis code.

6. A method of multiplexing packets of data bearing radio packets on a common communications channel, comprising:

modulating said radio packets in accordance with a trellis coded modulation scheme;

arranging for said trellis code modulated packets to be transmitted on said common communication channel in accordance with a multiple access scheme;

detecting collisions of said trellis code modulated packets resulting from contemporaneous transmission;

arranging for collided packets to be re-transmitted with substantially different synchronization data;

resolving any subsequently colliding re-transmitted radio packets in accordance with a multi-user detection process in dependence upon said synchronization data and said trellis codes.

7. A method of multiplexing packets of data bearing radio packets on a common communication channel as claimed in claim 6, further comprising:

adapting a super-state trellis of a sequence estimator of said multi-user detector in accordance with trellis codes with which said radio packets were modulated.

* * * * *